R. B. EUBANK, Jr. & J. C. EUBANK.
FLYING MACHINE.
APPLICATION FILED OCT. 15, 1908.
977,517.
Patented Dec. 6, 1910.
3 SHEETS—SHEET 1.
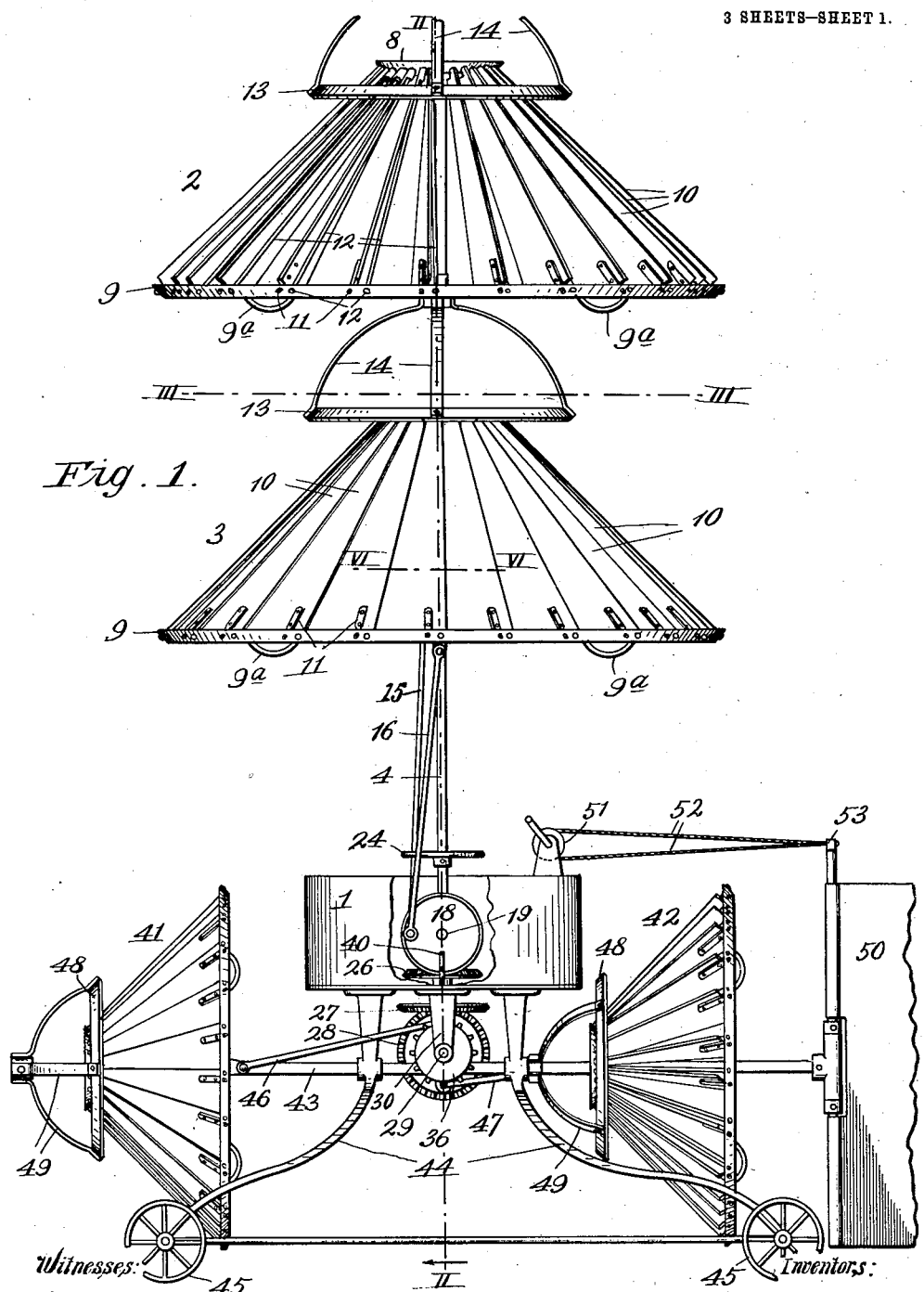
Witnesses:
R. Hamilton
M. Cox
Inventors:
R. B. Eubank, Jr. and J. C. Eubank,
By F. G. Fischer, Atty.

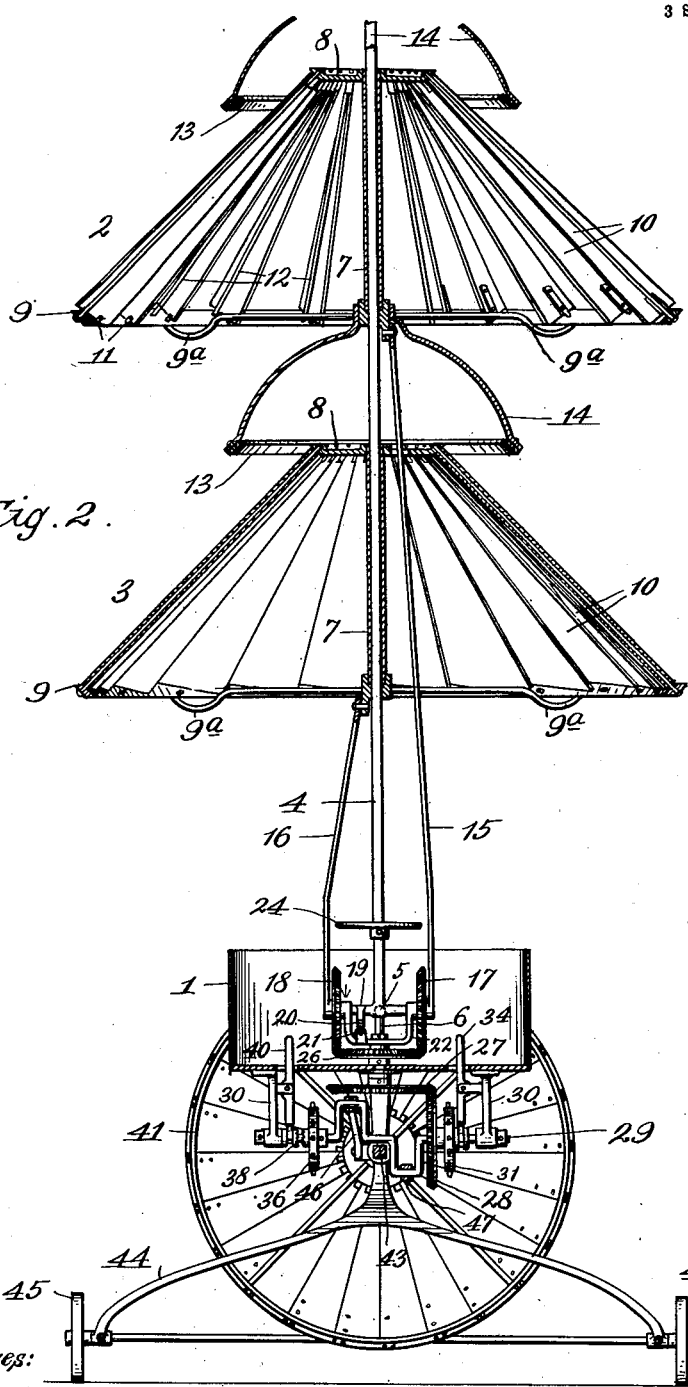

R. B. EUBANK, Jr. & J. C. EUBANK.
FLYING MACHINE.
APPLICATION FILED OCT. 15, 1908.
977,517.
Patented Dec. 6, 1910.
3 SHEETS—SHEET 3.
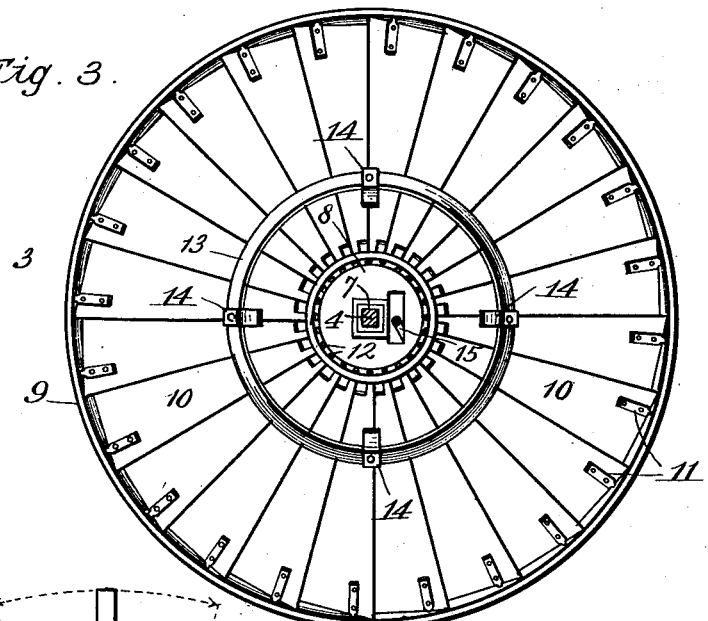
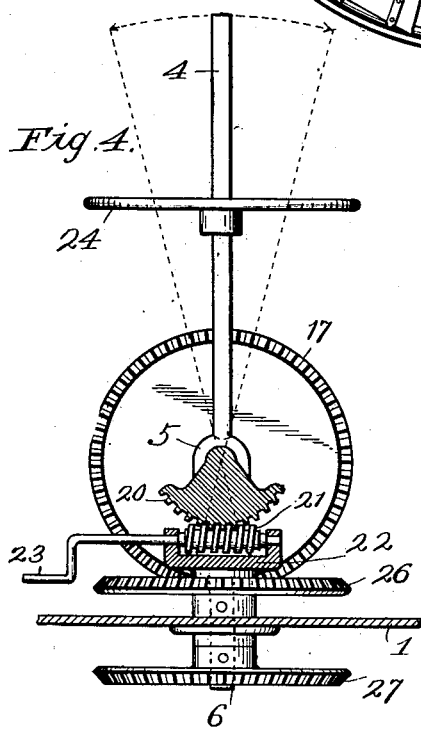
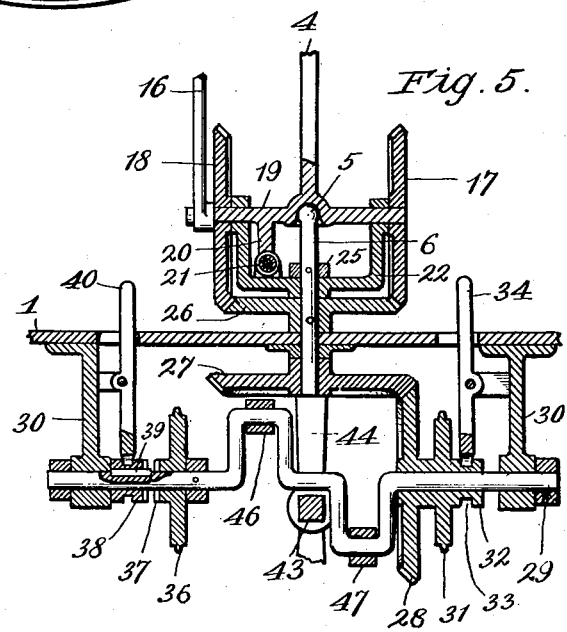
Witnesses:
R. Hamilton
M. Cox
Inventors:
R. B. Eubank, Jr. & J. C. Eubank,
By F. G. Fischer, Atty.

UNITED STATES PATENT OFFICE.

REUBEN B. EUBANK, JR., AND JUDSON C. EUBANK, OF KANSAS CITY, MISSOURI; SAID REUBEN B. EUBANK, JR., ASSIGNOR TO MARY E. EUBANK, OF KANSAS CITY, MISSOURI.

FLYING-MACHINE.

977,517.           Specification of Letters Patent.      Patented Dec. 6, 1910.

Application filed October 15, 1908. Serial No. 457,856.

*To all whom it may concern:*

Be it known that we, REUBEN B. EUBANK, Jr., and JUDSON C. EUBANK, citizens of the United States, residing at Kansas City, in the county of Jackson and State of Missouri, have invented certain new and useful Improvements in Flying-Machines, of which the following is a specification.

Our invention relates to improvements in flying machines, and our object is to provide a machine of this character embodying the elements of simplicity, safety, and complete control.

One important feature of the invention is the novel means whereby the ascent, descent, and steering of the machine is obtained. This and other features of the invention will hereinafter appear, and in order that it may be fully understood, reference will now be made to the accompanying drawings, in which:

Figure 1 represents a broken side elevation of the machine. Fig. 2 is a central vertical section of the same on line II—II of Fig. 1. Fig. 3 is a horizontal section on line III—III of Fig. 1. Figs. 4 and 5 are details of a portion of the mechanism for controlling the machine. Fig. 6 is an enlarged cross section on line VI—VI of Fig. 1.

In carrying out the invention we employ a car 1, which may be covered with a roof if desired to protect the operator from inclement weather. All the levers for controlling the machine are arranged in said car within convenient reach of the operator.

The ascent, descent, and steering of the machine are controlled by a pair of combination parachutes and propellers 2 and 3 of conical form, reciprocably-mounted upon a vertical shaft 4 having a ball and socket connection 5 with a short vertical shaft 6 journaled in the bottom of the car, as shown in Fig. 5. Said ball and socket joint acts as a thrust bearing between the shafts 4 and 6, and permits an arcual movement of shaft 4 relative to shaft 6. Said propellers consist of sleeves 7, reciprocably-mounted on shaft 4, disks 8, and rings 9 secured to the upper and lower ends, respectively, of said sleeves, and a series of valves 10, which automatically open and close as the propellers move upward and downward, respectively. Rings 9 are reinforced by radial arms 9ª whereby they are secured to the lower terminals of the sleeves 7.

By arranging the valves to open as the propellers make their upward strokes, little more than the edges of said valves will be presented to the air, hence they will offer but little resistance to the ascent of the machine, and by arranging them to close on the downward strokes of the propellers, they will present a solid surface to the air and thus drive the machine upward. The valves are provided at their lower terminals with pins 11, which are pivotally-mounted in rings 9, and the upper ends of said valves are pivotally-mounted upon rods 12 secured at their ends to disks 8 and rings 9. Pins 11 and rods 12 are located nearer to one of the longitudinal edges than the other of said valves, so the latter may be automatically opened and closed by the pressure of the air against the same. However, to insure the instant closing of the valves, just prior to the propellers making their downward strokes, we provide a pair of annuli 13 against which the valves contact and are closed thereby. To avoid shock or injury to the valves when contacting with said annuli, the latter are mounted upon resilient arms 14, the upper set of which is fixed to shaft 4, while the lower set is fixed to the lower terminal of the upper sleeve 7. The opening movement of the valves is limited by stops 9ᵇ, so they will strike the annuli at an angle and thus be readily closed by said annuli. Stops 9ᵇ extend inwardly from rings 9, as shown in Fig. 6.

Reciprocating motion is imparted to propellers 2 and 3 by connecting-rods 15 and 16, pivoted at their upper ends to the sleeves and at their lower ends to a pair of bevel gears 17 and 18, respectively, journaled upon a cross-arm 19 at the lower terminal of shaft 4. The pivotal connections to said gears are arranged, so that when one propeller is forced upward, the other is drawn downward, hence a constant uplift is exerted to either lift the machine or maintain it at a certain altitude.

As previously stated, shaft 4 has a ball and socket connection with shaft 6. This is for the purpose of permitting shaft 4 to be inclined in any direction so that the machine may be steered by the propellers 2 and 3, and also assisted in its forward movement by the same. The desired inclination of shaft 4 is effected by a toothed segment 20, depending from an arm 19, and a worm 21 journaled in a yoke 22 and provided with a crank 23, whereby it may be rotated. The turning of shaft 4 to the right or left, together with the propellers 2 and 3, to effect the steering of the machine is accomplished by a hand-wheel 24 fixed to said shaft. Yoke 22 retains shaft 4 upon shaft 6 and is pivotally-mounted upon the latter shaft, so that it may turn with the cross-arm 19. It is held from upward movement on shaft 6 by a collar 25 fixed to said shaft.

26 designates a bevel gear fixed to shaft 6, and intermeshing with the bevel gears 17 and 18 for the purpose of driving the same. Shaft 6 is driven by a bevel gear 27 fixed upon its lower terminal and driven by a bevel gear 28 loosely mounted upon a shaft 29, journaled in a pair of hangers 30 depending from the bottom of the car. The hub of bevel gear 28 is provided with a fixed sprocket-wheel 31 having connection with a motor-shaft, not shown, whereby it is driven. Said hub also has a peripheral groove 33 to receive the lower end of a hand-lever 34 whereby bevel gear 28 is shifted into and out of engagement with bevel gear 27.

36 designates a sprocket-wheel loosely mounted upon shaft 29 and provided with a clutch-member 37, adapted to be engaged by a clutch-member 38 slidably mounted upon shaft 29, but made to rotate therewith through the instrumentality of a feather 39. Clutch-member 38 is shifted into and out of engagement with clutch-member 37 by a hand-lever 40. Sprocket-wheel 36 has connection with the motor-shaft so that it will drive shaft 29 when clutch-member 38 is thrown into engagement with clutch-member 37. By independently connecting sprocket-wheels 31 and 36 to the motor-shaft, propellers 2 and 3 may be operated independently of two propellers 41 42, which are duplicates of propellers 2 and 3, and hence need no further description.

Propellers 41 42 are for the purpose of driving the machine forward, and hence are reciprocably-mounted upon a horizontal shaft 43 fixed in a frame 44, carrying car 1, and mounted upon four wheels 45, which carry the machine when the latter alights upon the ground. Motion is imparted to propellers 41 and 42 by connecting-rods 46 and 47, respectively, pivotally connected at their adjacent ends to the diametrically-opposed cranks of shaft 29, whereby the propellers are caused to move in opposite directions to each other, so that when one is moving forward with open valves, the other will be moving backward with closed valves, and thus drive the machine forward. As propellers 41 and 42 alternately reach the ends of their forward strokes, the valves are automatically closed by a pair of annuli 48, supported by resilient arms 49, fixed to shaft 43.

50 designates a rudder pivotally-mounted upon the rear end of shaft 43, for the purpose of assisting propellers 2 and 3 in steering the machine. Rudder 50 is controlled by a windlass 51 carried by the car, and a cable 52 which is given several turns upon the windlass and attached at its ends to the cross-head 53 of the rudder.

Operation: In starting a flight bevel gear 28 is thrown into mesh with bevel gear 27, in order to actuate the propellers 2 and 3, which lift the machine from the ground. After the desired altitude is attained, sprocket-wheel 36 is locked to shaft 29 so that the latter will, through the instrumentality of the intervening parts, drive the propellers 41 and 42, which drive the machine forward. Then to maintain the equilibrium of the machine, and also assist in driving the same forward, propellers 2 and 3 are inclined forward, and the machine may be steered either to the right or the left by grasping wheel 24 and swinging the propellers 2 and 3 in the desired direction thereby. If it is desired to make a sharp turn, rudder 50 is swung to the right or the left, as occasion demands, to assist propellers 2 and 3 in turning the machine. Should the motor get out of order, and thereby render the propellers inoperative, the machine will be prevented from descending too rapidly by the propellers 2 and 3, the valves of which will be automatically closed by pressure of the air beneath the same, and as said valves are conical in form the pressure will be equally distributed and thus maintain the equilibrium of the machine, so that it will descend in an upright position and alight upon wheels 45.

Having thus described our invention, what we claim is:

1. A flying machine, comprising, in combination, intergeared horizontal and vertical shafts, alternately operated propellers carried by each of said horizontal and vertical shafts and means for driving said propellers, each of said propellers consisting of a sleeve slidable on one of said shafts, an annular member carried on the lower end of said sleeve, a flanged disk carried by the upper end of said sleeve, and valves adapted to rotate between said disk and said annular member.

2. A flying machine, comprising, in combination, intergeared horizontal and vertical shafts, alternately operated propellers carried by each of said horizontal and vertical shafts and means for driving said propellers, each of said propellers consisting of a sleeve slidable on a shaft, a small upper annular member, a large lower annular member concentric with said upper member, substantially rectangular valves pivoted to rotate between said annular members, and concentrically disposed buffers mounted above each propeller to be struck by the valves when the latter are opened.

3. A flying machine, comprising, in combination, with a car, a vertical shaft, alternately operating propellers slidable on said shaft, valves carried by said propellers adapted to open outwardly on the downward stroke of said propellers, and annular buffers disposed to return said valves to their normal positions, said buffers having depending resilient mountings to hold said buffers in concentric relation to said propellers.

4. A flying machine, comprising, in combination, intergeared horizontal and vertical shafts, alternately operated propellers carried by each of said horizontal and vertical shafts and means for driving said propellers, each of said propellers comprising a sleeve, upper and lower annular members mounted upon and spaced by said sleeves, intermediate valves pivoted between said annular members to form a cone-like structure, and adapted to be opened upwardly, and buffing devices comprising annular resiliently mounted rings depended to telescope the upper ends of said cone-like structures and be in the paths of said valves.

In testimony whereof we affix our signatures, in the presence of two witnesses.

REUBEN B. EUBANK, Jr.
JUDSON C. EUBANK.

Witnesses:
F. G. FISCHER,
M. COX.